United States Patent [19]

Miller et al.

[11] Patent Number: 5,285,310
[45] Date of Patent: Feb. 8, 1994

[54] HIGH POWER REGENERATIVE LASER AMPLIFIER

[75] Inventors: John L. Miller; Lloyd A. Hackel, both of Livermore; Clifford B. Dane, Dublin; Luis E. Zapata, Livermore, all of Calif.

[73] Assignee: Regents of the University of California, Oakland, Calif.

[21] Appl. No.: 822,763

[22] Filed: Jan. 21, 1992

[51] Int. Cl.$^5$ .................. H01S 3/05; H01S 3/23
[52] U.S. Cl. .................. 359/338; 359/348; 372/94
[58] Field of Search .......... 359/338, 346, 348; 372/20, 30, 94

[56] References Cited

U.S. PATENT DOCUMENTS

| | | | |
|---|---|---|---|
| 4,191,928 | 3/1980 | Emmett | 359/348 |
| 4,725,787 | 2/1988 | Chandra | 359/338 |
| 4,943,782 | 7/1990 | Stephens et al. | 359/348 |
| 5,022,033 | 6/1991 | Hackell | 372/94 |

OTHER PUBLICATIONS

Armandillo, E.; Regenerative Amplification in a XeCl Excimer Laser with a Phase-Conjugating Brillouin Mirror; Optics Communications, vol. 49, No. 3, 1 Mar. 1984, pp. 198–200.
Park, et al.; Electronic Linewidth Narrowing Method for Single Axial Mode Operation of Q-Switched Nd:YAG Lasers; Optics Communications, vol. 37, No. 6, 15 Jun. 1981, pp. 411–416.
Pashinin, et al.; Regenerative YAG:Nd$^{3+}$ Amplifier with a Stimulated Brillouin Scattering Mirror; Sov. J. Quantum Electron., 18 (9), Sep. 1988, pp. 1092–1094.
Summers, et al.; Design and Performance of a High Average Power Zigzag Slab Laser, AMOSA (Optical Society of America) 1989 Annual Meeting, Technical Digest, 15–20 Oct. 1989, p. 230.
Weaver, et al.; Multikilowatt Pockels Cell for High Average Power Laser Systems, J. Appl. Phys, 68 (6), 15 Sep. 1990, pp. 2589–2598.
Yan, et al., High-Repetition-Rate Nd:Phosphate Glass Regenerative Amplifier, Conference on Lasers and Electro-Optics 26 Apr. to 1 May, 1987, OSA/IEEE, Digest of Technical Papers, pp. 150–151.
Hackel, L. A.; Conference on Lasers and Electro-Optics, Calif., May 25, 1990, Conf-900530-47.
Ledneva et al; Zh. Prikl. Spektrask. (USSR) vol. 36, #3, pp. 416–422, Mar. 1982.

*Primary Examiner*—Nelson Moskowitz
*Attorney, Agent, or Firm*—Henry P. Sartorio

[57] ABSTRACT

A regenerative amplifier design capable of operating at high energy per pulse, for instance, from 20–100 Joules, at moderate repetition rates, for instance from 5–20 Hertz is provided. The laser amplifier comprises a gain medium and source of pump energy coupled with the gain medium; a Pockels cell, which rotates an incident beam in response to application of a control signal; an optical relay system defining a first relay plane near the gain medium and a second relay plane near the rotator; and a plurality of reflectors configured to define an optical path through the gain medium, optical relay and Pockels cell, such that each transit of the optical path includes at least one pass through the gain medium and only one pass through the Pockels cell. An input coupler, and an output coupler are provided, implemented by a single polarizer. A control circuit coupled to the Pockels cell generates the control signal in timed relationship with the input pulse so that the input pulse is captured by the input coupler and proceeds through at least one transit of the optical path, and then the control signal is applied to cause rotation of the pulse to a polarization reflected by the polarizer, after which the captured pulse passes through the gain medium at least once more and is reflected out of the optical path by the polarizer before passing through the rotator again to provide an amplified pulse.

21 Claims, 6 Drawing Sheets

HIGH POWER REGENERATIVE LASER AMPLIFIER

The United States government has rights in this invention pursuant to Contract Number W-7405-ENG-48 between the United States Department of Energy and the University of California for the operation of Lawrence Livermore National Laboratory.

FIELD OF THE INVENTION

The present invention relates to laser amplifiers, and particularly to laser amplifiers generating high peak power and high energy per pulse output beams.

DESCRIPTION OF RELATED ART

High power laser amplifiers have a wide variety of applications. One important example is in the generation of X-rays used for X-ray lithography in the manufacture of integrated circuits. In this application, 1-20 nanosecond pulses of infrared radiation of about 20 joules per pulse with peak powers over a gigawatt are needed. Also in this application, these pulses must be generated from five to ten times per second to achieve sufficient performance for cost effective production of integrated circuits. These high power pulses are directed on a tape including an iron oxide, which generates an X-ray in response to the stimulation of the pulse. This source of X-rays is then used to illuminate integrated circuits in the X-ray lithography process.

The design of laser amplifiers which can achieve these performance goals has been limited in the prior art by a variety of factors related primarily to the tolerance of optical components in the amplifier to pulses of high energy laser light and average power loading. For instance, in one large class of amplifier designs, known as regenerative amplifiers, multiple passes through a single gain medium, or plural gain media, are used for efficient extraction of gain. In these regenerative amplifiers, an optical path is defined around which an input pulse transits a number of times. The efficient extraction of gain from the gain medium is limited, however, by losses in optical elements in the path, such as electro-optic switches, polarizers, and the like. For amplifiers which involve numerous transits of the optical path, even a small loss in a given component can decrease the gain to loss ratio of the amplifier significantly.

Furthermore, these optics typically have peak power damage thresholds. Perturbations in the beam as it transits the optical path can exceed these peak power damage thresholds. This results in damage to the optics and loss in efficiency in regenerative amplifier.

Another limitation in these multipass systems resides in average power thresholds of optical devices in the optical path. For systems which involve a number of transits of the optical path and repetitive pulsed operation, the average power dissipated in a given optical element can be quite high. Thus, the average power threshold of a given device can limit the output power of the amplifier.

A representative regenerative amplifier design of the prior art is shown in FIG. 1, which is a schematic diagram of a high average power amplifier described by Summers, et al., "Design Performance of a High Average Power Zig-zag Slab Laser", Optical Society of America, 1989 Annual Meeting in Orlando, Florida.

The amplifier design of FIG. 1 includes a first polarizer 10, a first Pockels cell 11, a second polarizer 12, a first mirror 13, a second Pockels cell 14, a third polarizer 15, a zig-zag amplifier 16, a second mirror 17, a third mirror 18, an anamorphic vacuum relay (telescope) 19, and a fourth mirror 20. Also, a lense 21, fifth mirror 22, lense 23, and phase conjugator 24 are included in the amplifier system. In operation, an input pulse is supplied incident on the first polarizer 10, and having a polarization which is reflected by the polarizer 10. This input beam passes through the first Pockels cell 11 without rotation, and is reflected by the second polarizer 12 into a ring-shaped optical path. From the second polarizer 12, the pulse proceeds to mirror 13 and Pockels cell 14, where it is rotated to a polarization which is transmitted by the third polarizer 15. It then proceeds through the zig-zag amplifier 16, mirror 17, mirror 18, telescope 19, mirror 20, through second polarizer 12, to mirror 13, and through the Pockels cell 14 without rotation. Thus, the pulse is captured, within the ring for a number of passes to achieve high gain. After one or more passes through the amplifier 16, the Pockels cell 14 causes the pulse to rotate so that it is reflected by third polarizer 15 into the phase conjugation leg of the amplifier. When it returns from the phase conjugator 24, it is again reflected by third polarizer 15 and supplied through Pockels cell 14 where it is rotated back to the polarization transmitted by the polarizers. It is then captured within the ring proceeding in the opposite direction for one or more passes through the amplifier. To couple the pulse out of the ring, the Pockels cell 14 rotates the pulse proceeding from third polarizer 15 toward mirror 13 so that it is 11. Pockels cell 11 rotates the pulse so that it is transmitted by first polarizer 10 and supplied as an output beam.

This amplifier design demonstrates many of the limitations of the prior art. As can be seen, each pass through the amplifier 16 in which gain is achieved also involves a pass through a number of elements which can cause significant loss, including the telescope 19, the polarizers 12 and 15, and the electro-optic switch, implemented by the second Pockels cell 14. Also, each of these elements is sensitive to perturbations in the beam. To limit the damage caused by perturbations, the relay telescope 19 relays an image near the amplifier 16 back on itself. This causes the Pockels cell 14 and the third polarizer 15 to reside at locations near the image plane to minimize the effects of diffraction and phase perturbations in the beam. However, the Pockels cell 11 is at a significant distance from the image plane and may be subject to damage due to diffraction and phase perturbations. Also, the relay telescope mirrors are far from the image plane. For this reason, the phase conjugator was employed to attempt to reduce perturbations further in the beam as it proceeds out of the amplifier.

In addition, both Pockels cells 11, 14 must withstand the full power of the output pulse, increasing the average power load on the Pockels cells, and subjecting the optics to higher peak powers.

These limitations of the amplifier design of FIG. 1, and similar limitations in other prior art amplifier designs, have made it impractical to design lasers capable of producing the energy per pulse and peak power required for cost effective production of integrated circuits using X-ray lithography, and for a variety of other applications. Accordingly, it is desirable to provide an amplifier design overcoming these limitations of prior art systems.

SUMMARY OF THE INVENTION

The present invention provides a regenerative amplifier design capable of operating at high energy per pulse, for instance, from 20-100 joules, at moderate repetition rates, for instance from 5-20 hertz. Furthermore, pulses having peak energy from 1-4 gigawatts may be achieved. This system can therefore be efficiently used in point source X-ray lithography, as well as many other applications.

According to one aspect of the invention, a laser amplifier is provided which comprises a gain medium and source of pump energy coupled with the gain medium; a polarization rotator, such as a Pockels cell, which rotates an incident beam in response to assertion of a control signal; an optical relay system which relays a first image plane near the gain medium to a second image plane near the rotator, and which relays the second image plane back near the gain medium; and a plurality of reflectors configured to define an optical path through the gain medium, optical relay system and rotator, such that each transit of the optical path includes at least one pass through the gain medium and only one pass through the rotator. Input means, and output means are provided, which may be implemented as a single polarizer, for coupling an input pulse into the optical path, and coupling an amplified pulse having a predetermined polarization out of the optical path. A control circuit is provided which is coupled to the rotator, for generating the control signal in timed relationship with the input pulse so that the input pulse is captured by the input means and it proceeds through at least one transit of the optical path, and then the pulse is rotated to the predetermined polarization, after which the captured pulse passes through the gain medium at least once more and is coupled out of the optical path by the output means before passing through the rotator again, to provide an amplified pulse.

The rotator is used to control the beam polarization to trap the beam within the ring by rotating it to a polarization transmitted by the polarizer, and then at an appropriate time couple it out by rotating the polarization to the predetermined polarization reflected by the polarizer. Thus, to extract a high power beam in the configuration of the present invention, the Pockels cell is controlled to rotate the beam from P to S polarization prior to the last two passes of the gain medium. In this configuration, the gain medium amplifies P polarization on initial passes through the ring, and amplifies S polarization on the last two passes. Immediately upon leaving the gain medium after the last two passes, the beam of S polarization is coupled out by the output polarizer. In a regenerative amplifier, such as that described according to the present invention, one half to two thirds of the power is extracted in the last two passes. Thus, this design results in minimal number of optical components in the optical path being exposed to the highest power laser energy.

In another aspect of the invention, there are at least two passes through the gain medium for each transit of the optical path. Furthermore, the gain medium includes first and second faces transverse to the optical path which permit transmission of light substantially independent of the polarization. This configuration allows for near unity fill of the gain medium, and thus, efficient extraction. In addition, the double pass significantly improves the gain to loss ratio of the ring, further improving the efficiency.

The amplifier configuration of the present invention involves, in effect, two relay telescopes. This allows the Pockels cell to be spaced a significant distance from the gain medium, but allows placement of all of the optical elements in the system near an image plane to minimize intensity spiking caused by diffraction and phase perturbations in the beam.

Yet another aspect of the invention arises in the placement of the Pockels cell, relay system, and output polarizer relative to the gain medium. In particular, the output polarizer is placed between the gain medium and the relay system so that the Pockels cell and the relay system are never loaded with the energy of the final two beam passes through the gain medium.

Other aspects and advantages of the present invention can be seen upon review of the figures, the detailed description, and the claims which follow.

DESCRIPTION OF THE PREFERRED EMBODIMENTS

Figure 1:
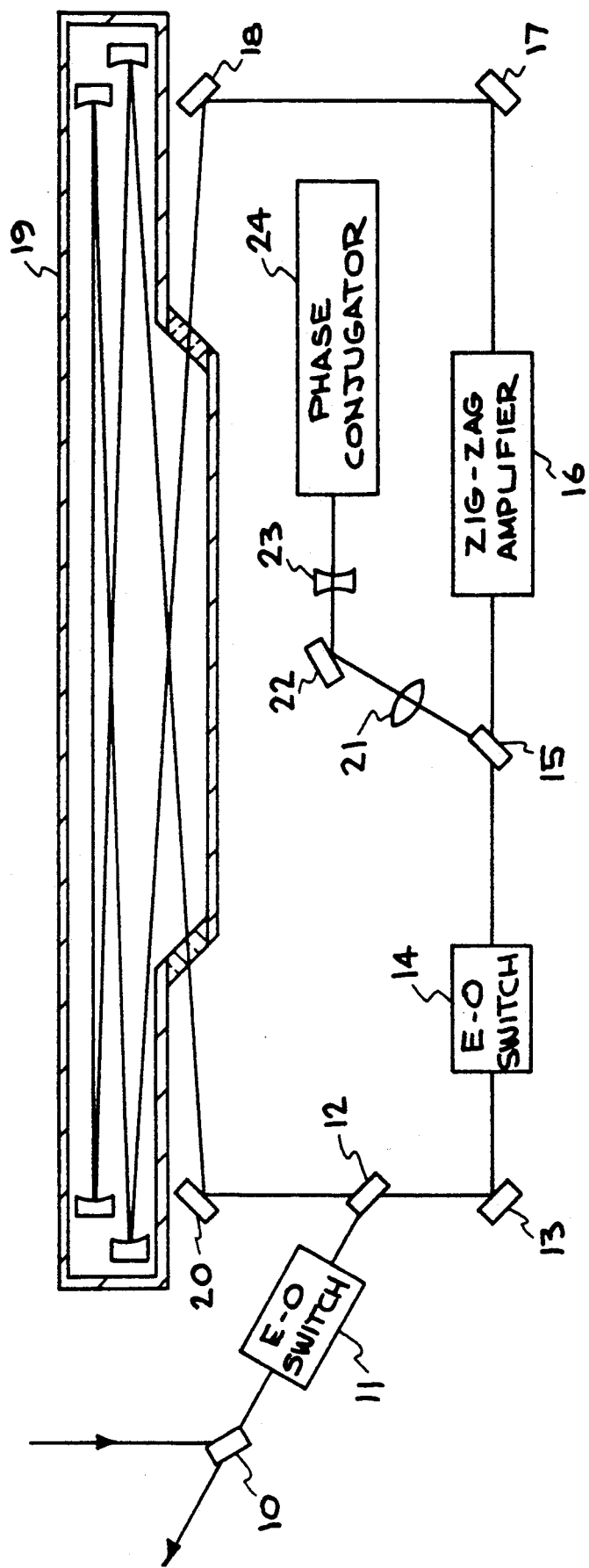
FIG. 1 is a schematic diagram of a prior art regenerative amplifier system.
Figure 2:
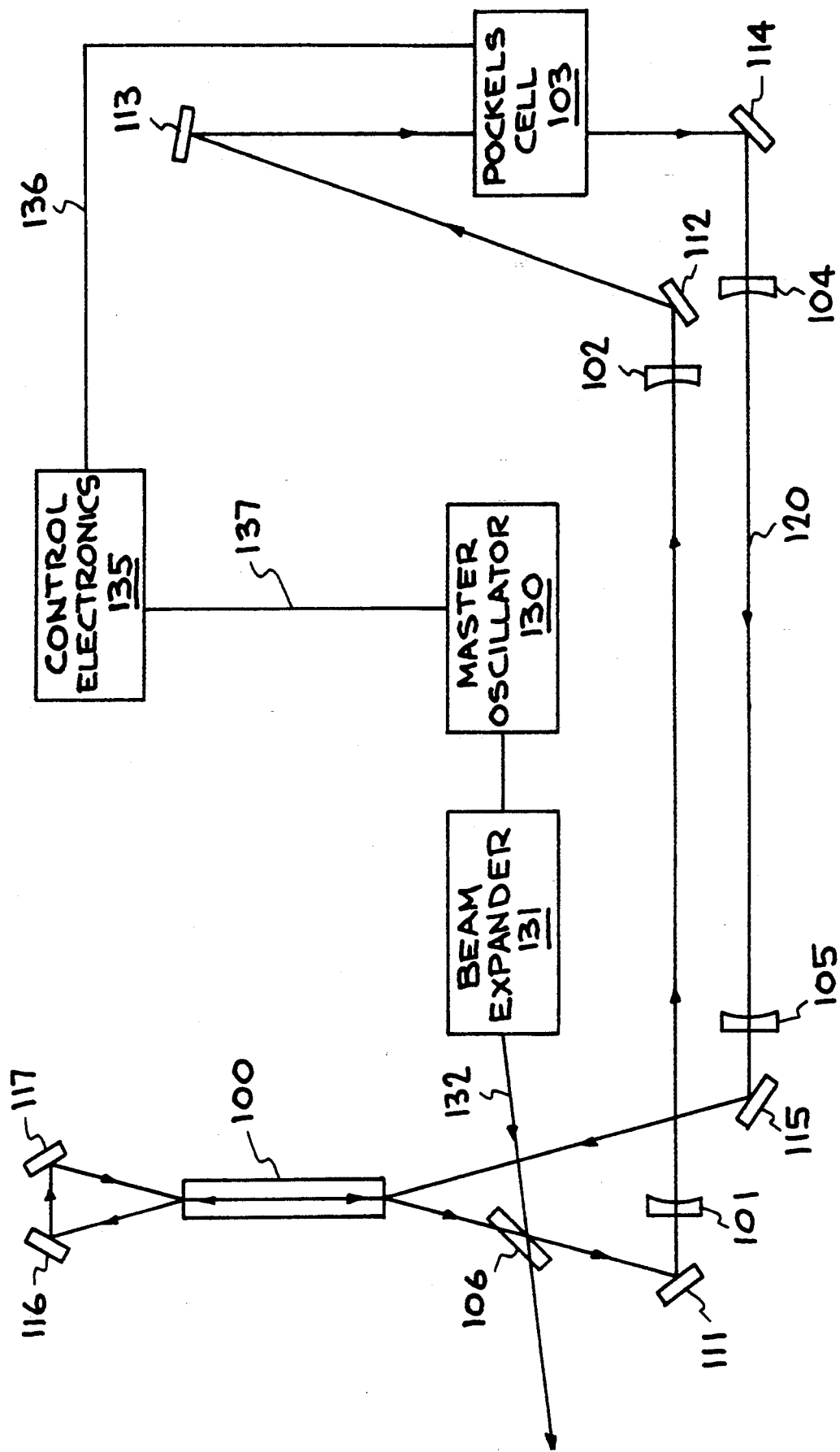
FIG. 2 is a schematic diagram of the laser amplifier according to the present invention.
Figure 3:
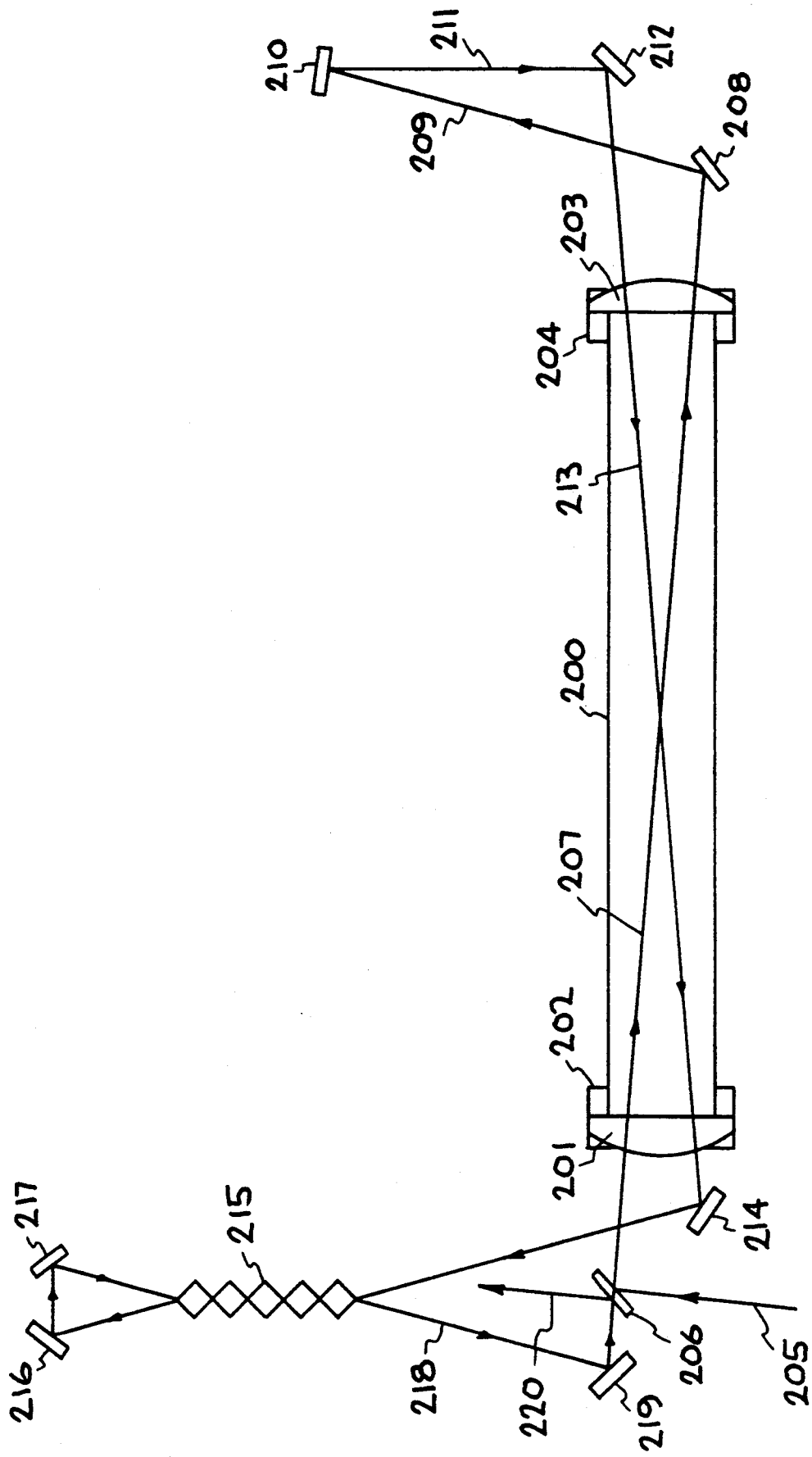
FIG. 3 is a diagram of the optical path of a preferred embodiment of the regenerative amplifier according to the present invention, illustrating a preferred implementation of the relay system.
Figure 4:
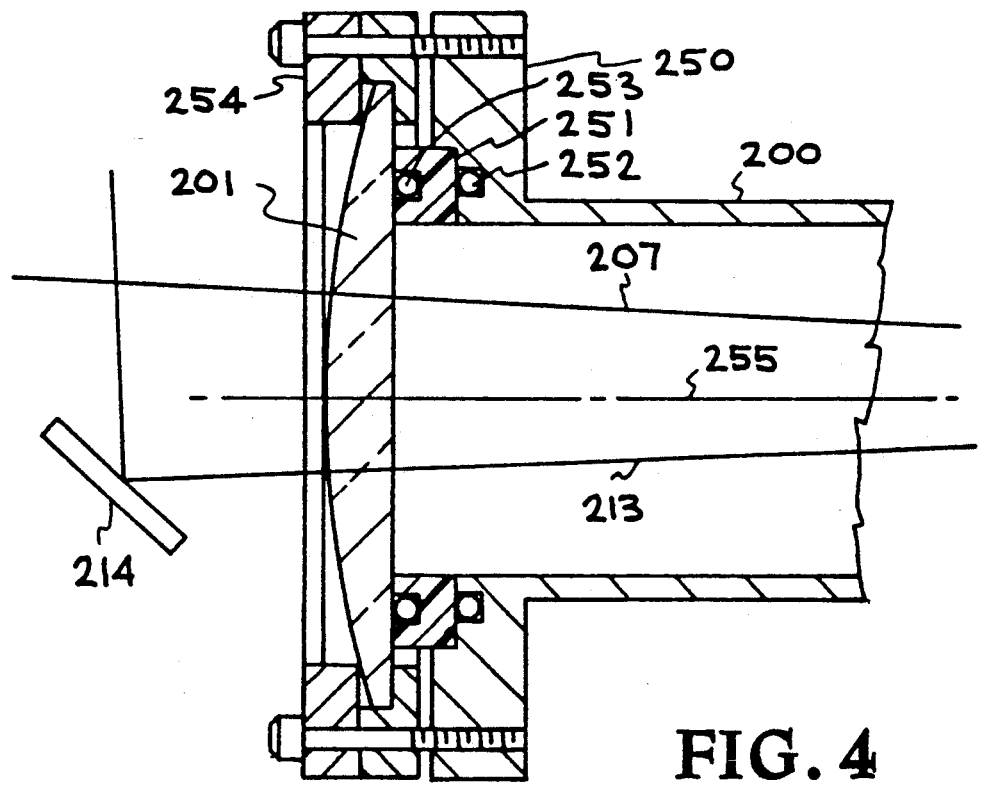
FIG. 4 is an expanded view of a lense mounted in the relay system shown in FIG. 3.
Figure 6:
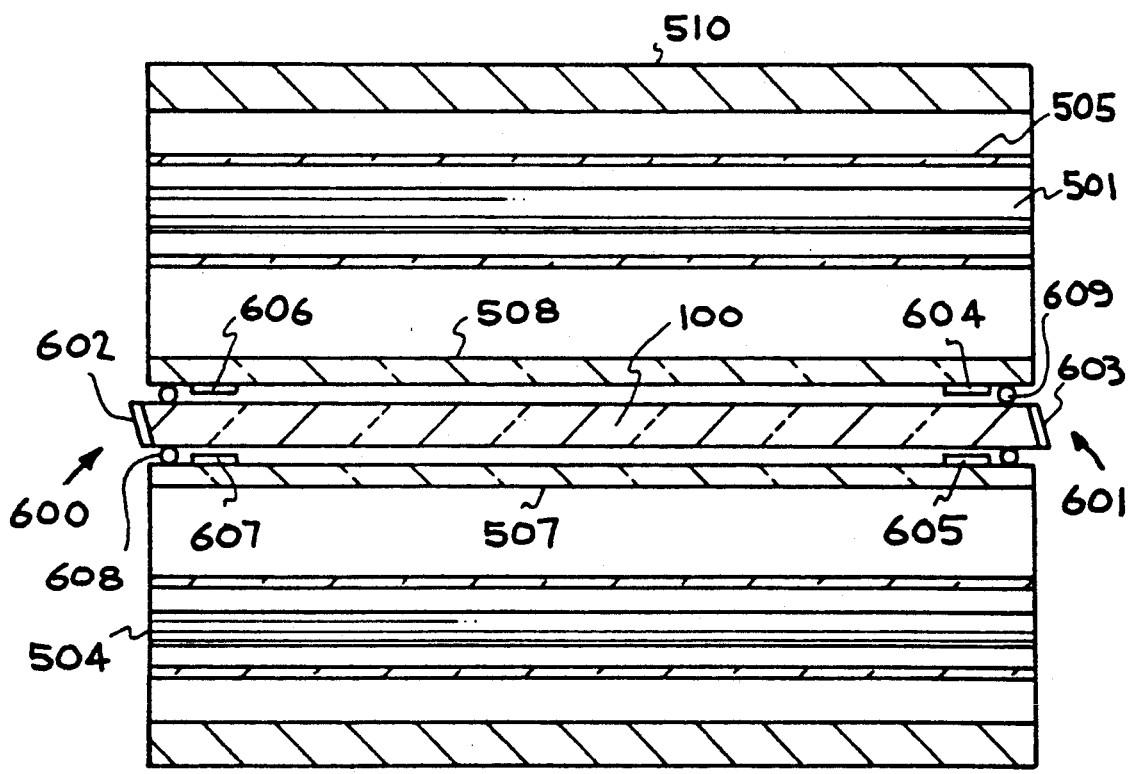
FIG. 6 is a schematic cross-section of the gain medium and pump cavity taken parallel to the optical path according to a preferred embodiment.
Figure 5:
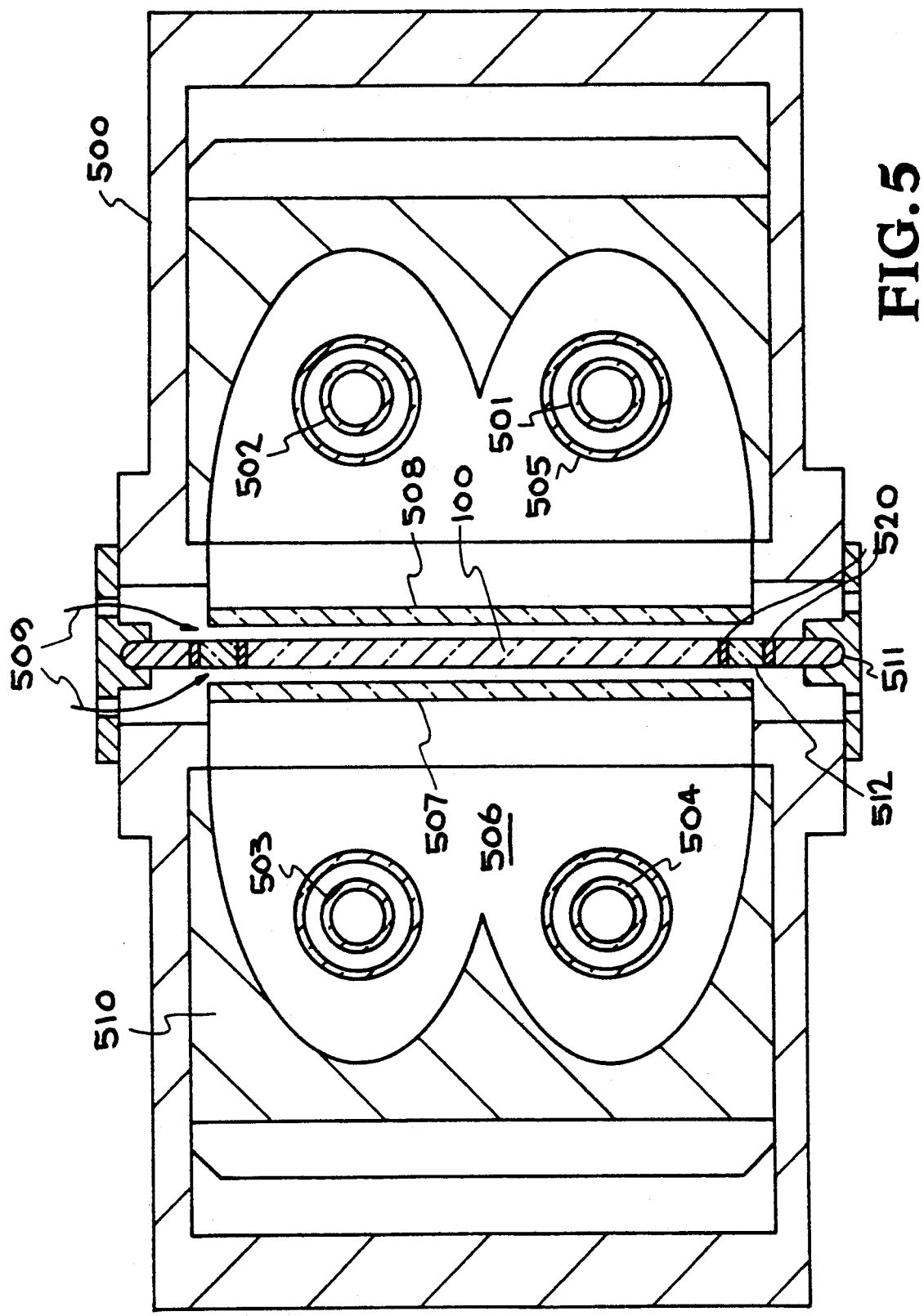
FIG. 5 is a schematic cross-section orthogonal to the optical path of the gain medium and pump cavity in a preferred embodiment.
Figure 7:
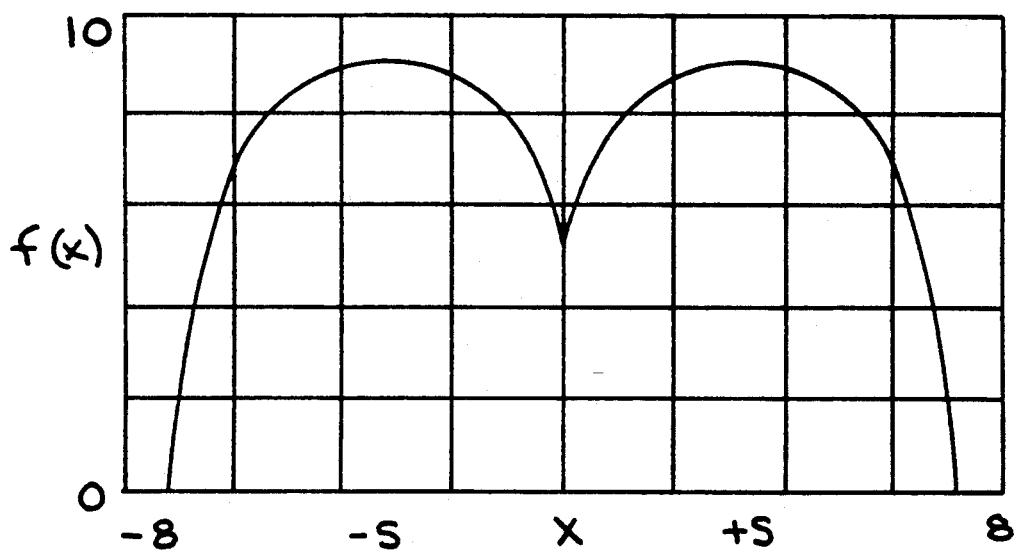
FIG. 7 is a graph of a profile of the pump cavity reflector according to a preferred embodiment.

A detailed description of preferred embodiments of the present invention is provided with respect to FIGS. 2-6. FIG. 2 provides a schematic overview of the amplifier system. FIGS. 3 and 4 provide implementation details of a preferred embodiment of the relay system. FIGS. 5-7 illustrate certain features of the gain medium and pump cavity used in a preferred system.

FIG. 2 illustrates the layout of the amplifier system according to the present invention. As can be seen, the amplifier includes a slab-shaped gain medium 100, a first relay telescope 101→102 consisting of lenses 101 and 102, a Pockels cell 103, and a second relay telescope 104→105 consisting of lenses 104 and 105. Also, a polarizer 106 is included for capturing an input pulse, and coupling an output pulse out of the optical path. Seven flat, high reflecting mirrors 111, 112, 113, 114, 115, 116, and 117 define an optical path, schematically represented by the line 120, through the slab 100, relays 101→102 and 104→105, and Pockels cell 103. Optional path 120 also proceeds through the polarizer 106.

A master oscillator 130 and beam expander 13 supply an input pulse along path 132. The input pulse has S polarization and reflects off the back of polarizer 106. It proceeds around the optical path through mirror 111, relay telescope 101→102, mirrors 112 and 113 to the Pockels cell 103, Where its polarization is rotated by 90° to the P polarization. It then proceeds along the optical path to mirror 114 through relay 104→105, off mirror 115 into the slab 100 where it is reflected by mirrors 116 and 117 back through the slab 100. Near unity fill of the pumped volume is accomplished by a first zig-zag pass and a second zig-zag pass which are essentially mirror images about the direction of propagation. In this way, the second zig-zag pass will tend to extract gain from regions that may have been missed in the first pass.

Because it had been rotated at the Pockels cell 103 from the S polarization to the P polarization, the beam leaving the second pass of the slab 100 is transmitted by polarizer 106 through the ring. As long as the polarization of the pulse remains in the P polarization, it will be captured in the ring for a plurality of transits. In the preferred system, it will transit the ring at least one more time, for third and fourth passes through the slab 100. In the next transit of the ring, the Pockels cell controlled by control electronics 135 switches the polarization from the P polarization to the S polarization. In the S polarization, the beam proceeds off of mirror 114 through telescope 104→105, and off of mirror 115 for fifth and sixth passes through the slab 100. As it exits the slab 100, the pulse is reflected by the polarizer 106 as a high energy output pulse.

The characteristics of this amplifier configuration include the use of a single polarizer 106 within the optical path, a first telescope 101→102 relays an image of the input aperture located near the slab 100 to a location near the Pockels cell 103, and a second telescope 104→105 relays the image near the Pockels cell 103 back to near the slab 100. In this way, the slab 100 and polarizer 106 are near a first relay plane, and the Pockels cell 103 is near a second relay plane which have a relatively smooth distribution of power with minimal phase and amplitude perturbation. In addition, the pulse does not proceed through the Pockels cell or relay telescopes after the final two passes through the slab 100. This minimizes the average power seen by the Pockels cell 103 and relay telescopes 101→102, 104→105, and minimizes the risk that perturbations in the pulse will exceed the peak power thresholds of the Pockels cell or the telescopes 101→102, 104→105.

Thus, the amplifier illustrated in FIG. 2 exhibits low loss, with two slab passes per ring transit, and immediate output coupling of the high power beam before it passes through other lossy optical elements. It also exhibits a very high extraction efficiency because of multiple passes through the ring. This amplifier design has high optical tolerance because all optical components in the optical path are placed near images of the input aperture, minimizing the likelihood of high peak perturbations in the beam. Finally, a low Pockels cell power load is achieved because the polarization is switched before the final two slab passes during which one half to two thirds of the power is extracted from the slab.

Each of the components of the ring, as implemented in a preferred system, is described as follows.

MASTER OSCILLATOR 130

In a preferred system, the master oscillator 130 is implemented with a self seeding, Nd:YLF flash lamp pumped laser, derived from a self-seeded laser concept for Nd:YLF described in U.S. Pat. No. 5,022,033, issued Jun. 4, 1991, invented by Lloyd Hackel. It generates an output pulse of approximately 50 millijoules at 10–50 hertz, in a single spatial mode $TEM_{OO}$ and a single temporal mode at a wavelength near 1.053 micrometers. The output pulse beam of the master oscillator 130 has a diameter of approximately 3mm.

Alternative oscillators which provide a pulse or series of pulses of high power laser radiation at consistent single frequency with good amplitude and temporal stability can be used.

BEAM EXPANDER 131

The output of the master oscillator 130 is supplied through a beam expander 131 to condition the beam to fill the rectangular cross-section of the slab 100 within the optical path of the amplifier. In the preferred system, the beam expander includes a 10×1 prism beam expander which expands the beam to 3×30mm with very little aberration. After expansion by the prism beam expander, an anamorphic imaging telescope uniformly expands the beam to 1×10cm.

The telescope relays an image of the input aperture into the ring, and preferably to a location near or in the gain medium. The edges of the beam are shaped using an aperture in combination with the prism beam expander and the beam expander telescope to control the beam contours. A variety of aperture designs may be applied to improve the shape of the beam within the amplifier. For instance, a serrated edge aperture, in combination with a spatial filter and the telescope, may establish a good, hard edge for the expanded beam to improve the efficiency of fill in the slab.

POLARIZER 106

In the preferred system, the polarizer 106 is a thin film polarizer composed of high damage threshold material such as hafnia/silica in multiple layers, on a fused silica substrate. Such polarizers are commercially available from OCLI in Santa Rosa, California.

The coated face of the polarizer 106 faces the slab 100. The polarizer 106 is mounted at Brewster's angle.

This polarizer 106 provides both an input coupling and an output coupling function. Alternative designs may use separate components for these functions.

MIRRORS

All seven mirrors in the optical path of the embodiment of FIG. 2 are formed by flat, high reflecting, high damage threshold mirrors manufactured with hafnia/silica coatings, with reflectivity near 99.9% at the wavelength of the amplifier.

POCKELS CELL

The Pockels cell in the preferred system is capable of handling up to one kilowatt average power in an aperture of 12mm×140mm. The electroactive material is potassium dihydrogen phosphate (KDP) with its deuterated isomorph, KD*P (greater than 93% deuterated). The deuterated isomorph is used to lower the optical absorption and obtain higher electrooptic coefficients. This Pockels cell is thermally compensated and designed according to the parameters described in Weaver, et al., "Multi KiloWatt Pockels Cell for High Average Power Laser Systems", J. Appl. Phys., 68 (6), Sept. 15, 1990, pp. 2589-2598. It is a 90° polarization rotator with no applied voltage. Other Pockels cell designs capable of meeting the average and peak power standards of the amplifier may be used. Also, the Pockels cell should have low loss, i.e., greater than 95% transmission. Further, a large aperture is required to sustain the large rectangular beam amplified by the slab 100. The damage threshold of greater than 4 joules per $cm^2$ for the pulse lengths generated is required. These parameters are met using KD*P plates manufactured by Cleveland Crystals, Inc., in Cleveland, Ohio.

OPTICAL RELAY SYSTEM

FIG. 3 illustrates a preferred embodiment of the optical relay system according to the present invention. The two telescopes of the relay system are implemented using two instead of four lenses by operating the lenses slightly off-axis. Thus, the telescopes include a vacuum chamber 200 having a first lense 201 mounted by a vacuum tight seal 202 on the vacuum chamber 200, and a second lense 203 mounted by vacuum tight seal 204 on the vacuum chamber 200. Each of the lenses 201, 203 is a 1.2 meter focal length lense. The spacing between lenses 201 and 203 is approximately 2.4 meters adjusted so that the lense pair is afocal.

An optical path for the preferred system is also illustrated in FIG. 3. According to this optical path, an input beam is supplied along segment 205 into polarizer 206. Polarizer 206 reflects the beam along segment 207 through lenses 201 and 203 off of lense axis 255 (shown in FIG. 4), to provide the first telescope 201→203. The output of telescope 201→203 is reflected off mirror 208 along segment 209 to mirror 210. From mirror 210, it is reflected along segment 211 to mirror 212 and back through lense 203 and lense 201 which provide the seoond telescope 203→201 along segment 213 off of lense axis 255. The pulse proceeding along segment 213 reflects off mirror 214 through a zig-zag path 215 in the slab. From zig-zag path 215, the beam reflects off mirrors 216 and 217 and proceeds back through the slab. The beam then proceeds along segment 218 to mirror 219, and from mirror 219 either through polarizer 206 or reflected along output path 220, depending on the polarization of the pulse. (The Pockels cell and slab are not shown in FIG. 3.)

In this optical path, the slab (not shown) and the Pockels cell (not shown) are placed near images of the input aperture. The image planes are relayed by the telescopes 201→203 and 203→201 to symmetrical points in the optical path, such as between mirrors 216 and 217, and between mirrors 210 and 212. The placement of the slab and the Pockels cell are dictated by the desire to place them as close as possible to the respective image planes, while maintaining reasonable layout space requirements. Thus, the Pockels cell is placed in segment 211, and the slab is placed at a position schematically represented by the zig-zag path 215.

FIG. 4 is an expanded view of lense 201 on the vacuum chamber 200. As can be seen, vacuum chamber 200 includes a flange 250. A lense mount spacer 251 (made of acetal thermoplastic known in the trade as Delrin or other suitable materials) is placed on flange 250 and sealed by O-ring 252. Lense 201 is placed adjacent lense mount spacer 251 and sealed by O-ring 253. The lense 201 is mounted in a lense holder 254 exposing the outside surface of the lense to the beam.

In order to allow adjustment, the lense mount spacer 251 can be machined by mechanical shaving after experimental measurement of the focal lengths at low power. Using this technique, the lense pair is adjusted so that they are afocal.

In the preferred system, commercially available 25cm high BK7 lenses are used, with 1.2 meter focal lengths. As can be seen, the telescopes 201→203 and 203→201 proceed off axis of the lenses. Using the 25cm high lenses, a 1cm wide×10cm high beam, slightly off axis is transmitted with minimum distortion. Other size lenses could be used as suits the needs of a particular application. Also, materials such as fused silica may be used for the lense in order to improve the damage threshold, if necessary.

The vacuum chamber 200 is evacuated to approximately $10^{-4}$ torr, to prevent air breakdown at the focal point of the optical relays.

CONTROL ELECTRONICS 135

Control electronics 135 controls the Pockels cell by asserting a control signal across line 136 in timed relationship with the input pulse generated by the master oscillator 130. Thus, the control electronics 135 is coupled with the master oscillator 130 across line 137. Control electronics generates the control signal so that the Pockels cell is not energized and causes rotation of the input pulse from the S polarization to the P polarization in the first transit of the optical path, and then the Pockels cell is energized until the final transit of the optical path. In the final transit of the optical path, the Pockels cell is de-energized to rotate the beam back to the S polarization prior to its final two passes through the slab 100.

Control electronics 135 includes a high current, high speed power supply capable of generating a 400 nanosecond pulse of 20 kilovolts with a 10-15 nanosecond rise time (90% of full wave voltage) and fall time to energize the Pockels cell. Power supplies meeting this specification for driving the Pockels cell described above are manufactured by American Control Engineering, of San Diego, California.

SLAB 100 AND PUMP CAVITY

FIGS. 5 and 6 illustrate the slab and pump cavity used according to the present invention. FIG. 5 is a schematic cross-section taken transverse to the optical path, while FIG. 6 is a schematic cross-section taken parallel to the optical path. As can be seen in FIG. 5, slab 100 is mounted within a pump cavity 500 with 4 lamps 501, 502, 503, and 504. Lamps 501, 501, 503, 504 are Xenon flash lamps mounted within respective coolant jackets (e.g., 505) as known in the art. These lamps are in turn mounted in a flooded reflector cavity 506. Plates of glass 507, 508 are mounted on each side of the slab 100 to establish a channel for the flow of cooling water in contact with the slab 100 as indicated at arrows 509. The flooded reflector cavity is encased by a diffuse reflector 510, such as a Spectralon (trademark) coated reflector which is commercially available from Labsphere, Inc. in North Sutton, NH.

The slab 100 is secured to mounting bar 511 on each side. Between the mounting bar 511 is an absorbing glass plate 512 which absorbs the radiation subject to gain within the slab 100 to prevent parasitic oscillation transverse to the preferred optical path. Between the absorbing glass plate 512 and the slab 100, an index matching material 520 called Urapol 35-79X (manufactured by Dow Chemical Co., Sarnia, Ontario, Canada) is used to bond the slab 100 to the plate 512 and mounting bar 511. The Urapol serves to insulate the slab from heat absorbed in the glass 512, and prevent reflections at the interface between the slab and the mount.

Between the glass plates 507, 508 and the slab 100, a 1mm gap is provided to allow flow of cooling water along path 509 on each side of the slab. Positive and negative pressure pumps on either side of the slab are used to maintain the water pressure on the slab at near atmospheric pressure, while establishing a turbulent flow of cooling water.

In the preferred system, the slab is a 10mm×140mm ×419mm slab of neodymium doped glass, doped in the range of 3 to 3.5×10$^{20}$/cm$^3$. Suitable glass materials include APG1 glass manufactured by Schott Glass in Duryea, Pennsylvania, or HAP4 from Hoya Optics in Fremont, California.

FIG. 6 is a schematic cross-section taken parallel to the optical path. It illustrates first that the input face 600 and the output face 601 of the slab are slightly wedged at 88.5° with respect to top surface 620 of slab 100 and parallel, to prevent parasitic oscillation within the slab. Additionally, the faces 600, 601 include anti-reflective coatings 602, 603, preferably manufactured of high tolerance multi-layer hafnia/silica, or other suitable materials such as Solgel available at Lawrence Livermore National Laboratory. Thus, the slab faces 600, 601 allow transmission essentially independent of polarization. In particular, the slab can receive the pulse in either the P or S polarization as it transits around the optical path.

In addition, FIG. 6 illustrates a technique used to minimize perturbations generated in the slab. Because of the zig-zag optical path in the slab, there is a potential that different portions of the beam entering one face 600 may see different optical paths as they propagate through the slab. In order to ensure that the gain profile of all points along the beam are relatively uniform, shades formed by shims 604, 605, 606, 607 are mounted near the faces 600, 601 of the slab. These shims 604, 605, 606, 607 are used to tailor the length of the pump cavity relative to the slab, and ensure that the input and output shadows match. An alternative way of accomplishing this goal is to shorten the reflector flash lamp assembly so that the ends of the slab near faces 600, 601 are not illuminated. Shim widths are determined using computer modelling of the pump energy profile and optical paths within the slab. For a 10mm thick slab having faces with 43° wedges, a tip to tip optical path length of 418.7mm and a total of 10 internal reflections so that the incident angle at the entrance face is 56.74°, the pumped length of the slab is 326.6mm.

Also, FIG. 6 illustrates the use of O-rings 608, 609 as water seals to enclose the cooling fluid between the slab and the glass plates 507, 508. Because of the positive and negative pressure pumps used to supply the cooling fluid, light O-ring pressure is sufficient to seal the pump cavity.

The glass in the flashlamp envelopes 501, and tubes, e.g., 505, are cerium doped glass to absorb ultraviolet radiation from the flashlamps and prevent solarization of the components in the pump cavity. Also, it may be desirable to dope the glass in the windows 507, 508 to absorb light with a wavelength shorter than about 400nm.

The reflector illustrated in FIG. 5 is shaped according to a computer modelling based on the height of the slab, the number of flashlamps, the diameter of the plasma within the flashlamps, and the doping in the slab. This computer modelling generates an x-y position for the flashlamps and a shape for the reflector to achieve a substantially uniform pumping energy within the slab.

According to the computer modelling, the reflector contour is defined as follows.

Define the reflector contour f(x) based on the cubic:
a=9
b=−0.5
c=0.5
d=−0.234375
Original equation: fo(x)=a+b x+c x$^2$+d x$^3$
Symmetry axes at +−s: S=3.2
Half-aperture: xmax=7.2
Composite reflector curve:

$$x < -s : f(x) = fo(-x-s)$$

$$-s < x < o : f(x) = fo(x+s)$$

$$o < x < s : f(x) = fo(-x+s)$$

$$s < x : f(x) = fo(x-s)$$

This curve is illustrated in FIG. 7 for reference.

This shape and the lamp locations (at y=5.65cm, and x+/−3.8cm) were arrived at by iterating variables to maximize source flatness at the slab plane.

CONCLUSION

For applications such as X-ray lithography discussed above, 20 joules per pulse with a 5–7 nanosecond pulse at 3–10 hertz is required. This will result in the generation of 10mJ/cm$^2$ per pulse of X-rays at a target at a standoff of 20cm, when used with iron oxide tape as the point source. The amplifier configuration of the present invention with an Nd:glass gain medium, is well suited for such applications.

The configuration provided according to the present invention is suitable for use with other gain materials and other components that may generate even higher powers.

The present invention is capable of producing such high energies in part because it minimizes the number of lossy optical elements in the path of the high energy pulses, and increases the gain to loss ratio of the amplifier.

The new design incorporates two relay telescopes, one to relay from the slab to the Pockels cell and one to relay from the Pockels cell back to the slab. With this configuration, all optics can be placed very near to images of the input aperture, and thus have sharp edges free of diffraction ripples. In another aspect of the new design, the slab is double passed on each transit of the ring. This configuration allows for unity fill of the slab and efficient extraction of energy. In addition, the double pass significantly improves the gain to loss ratio of the ring.

Another important aspect of the design is the placement of the Pockels cell and the output polarizer. This new design results in minimal number of optical components exposed to the high power laser energy of the final passes of the slab. In particular, the Pockels cell and relay telescopes are never loaded with the energy of the final two beam passes.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. A laser amplifier, comprising:
   a gain medium;
   a source of pump energy coupled with the gain medium;
   a controllable polarization rotator;
   a plurality of reflectors configured to define an optical path through the gain medium and rotator, each transit of the optical path including at least one pass through the gain medium and only on pass through the rotator;
   telescopic relay means, mounted in the optical path, for relaying an image in the near field of the gain medium to a location in the near field of the rotator;
   input means for coupling an input pulse into the optical path to provide a captured pulse for regenerative amplification; and
   output means for coupling an amplified pulse having a predetermined polarization out of the optical path; and
   means, coupled with the polarization rotator, for controlling the rotator in timed relationship with the input pulse so that the captured pulse proceeds through at least one transit of the optical path, and then the rotator rotates the polarization of the pulse to the predetermined polarization, the captured pulse passes through the gain medium at least once more while having the predetermined polarization, and then is coupled out of the optical path by the output means to provide an amplified pulse, before passing through the rotator again.

2. The laser amplifier of claim 1, wherein each transit of the optical path includes at least two zig-zag passes through the gain medium which in combination accomplish near unity fill of the gain medium.

3. The laser amplifier of claim 1, wherein the gain medium includes first and second faces transverse to the optical path, and the first and second faces permit transmission of light through the gain medium substantially independent of polarization.

4. The laser amplifier of claim 3, wherein the first and second faces of the gain medium have anti-reflective coatings.

5. The laser amplifier of claim 1, wherein the gain medium comprises a slab, and the source of pump energy comprises a pump cavity, enclosing the slab, and supplying a substantially uniform pump energy distribution in the slab to minimize perturbations in the pulse.

6. The laser amplifier of claim 1, wherein the polarization rotator comprises a Pockels cell.

7. The laser amplifier of claim 1, wherein the relay means comprises a vacuum chamber, a first lense mounted with a vacuum tight seal at a first end of the vacuum chamber, and a second lense mount by a vacuum tight seal at a second end of the vacuum chamber, and wherein the first and second lenses are mounted so that the optical path proceeds slightly off axis through the lenses.

8. The laser amplifier of claim 1, wherein the input means and the output means comprise an optical element mounted transverse to the optical path between the gain medium and the relay means, and having first and second faces at near Brewster's angle transmitting a polarization orthogonal to the predetermined polarization, the optical element reflecting light having the predetermined polarization.

9. The laser amplifier of claim 8, wherein the input pulse has the predetermined polarization and is supplied incident on the second face of the optical element so that it is reflected into the optical path, and the control means controls the rotator in timed relationship with the input pulse so that the captured pulse is rotated in a first pass through the rotator to a polarization transmitted by the optical element within the optical path, and so that after at least one transit of the optical path, the captured pulse is rotated to the predetermined polarization, passes though the gain medium at least once more and is incident on the first face of the optical element so that it is reflected out of the optical path to provide the amplified pulse.

10. A laser amplifier for producing amplified pulses, having energy greater than about 20 joules per pulse and peak power greater than about a gigawatt, comprising:
    a gain medium having first and second faces permitting transmission of light through the gain medium substantially independent of polarization;
    a source of pump energy coupled with the gain medium for producing a substantially uniform distribution of pump energy within the gain medium
    a controllable polarization rotator having a peak power damage threshold;
    a plurality of reflectors configured to define an optical path through the gain medium and rotator, each transit of the optical path including at least two passes through the gain medium and only one pass through the rotator;
    telescopic optical relay means mounted in the optical path between the gain medium and the rotator, for relaying an image in the near field of the gain medium to a location in the near field of the rotator, so that a relatively smooth power distribution of the image in the near field of the gain medium is established in the near field of the rotator to prevent perturbations within the rotator over the peak power damage threshold;
    input means for coupling an input pulse into the optical path to provide a captured pulse for regenerative amplification;
    output means for coupling an amplified pulse having a predetermined polarization out of the optical path; and
    control means, coupled with the polarization rotator, for controlling the rotator in timed relationship with the input pulse so that the captured pulse proceeds through at least one transit of the optical path, and then the pulse is rotated to the predetermined polarization, and the captured pulse passes through the gain medium at least once and is coupled out of the optical path by the output means to provide the amplified pulse, before passing through the rotator again.

11. The laser amplifier of claim 10, wherein each transit of the optical path includes at least two zig-zag passes through the gain medium which in combination accomplish substantially unity fill of the gain medium.

12. The laser amplifier of claim 10, wherein the first and second faces of the gain medium have anti-reflective coatings.

13. The laser amplifier of claim 10, wherein the gain medium comprises a slab consisting of Nd:glass, and the source of pump energy comprises a pump cavity, enclosing the slab, and supplying a substantially uniform pump energy distribution in the slab to minimize perturbations in the pulse.

14. The laser amplifier of claim 10, wherein the polarization rotator comprises a thermally compensated Pockels cell.

15. The laser amplifier of claim 10, wherein the relay means comprises a vacuum chamber, a first lense mounted with a vacuum tight seal at a first end of the vacuum chamber, and a second lense mount by a vacuum tight seal at a second end of the vacuum chamber, and wherein the first and second lenses are mounted so that the optical path proceeds slightly off axis through the lenses.

16. The laser amplifier of claim 10, wherein the input means and the output means comprise an optical element mounted transverse to the optical path between the gain medium and the relay means, and having first and second faces at near Brewster's angle transmitting a polarization orthogonal to the predetermined polarization, the optical element reflecting light having the predetermined polarization.

17. The laser amplifier of claim 16, wherein the input pulse has the predetermined polarization and is supplied incident on the second face of the optical element so that it is reflected into the optical path, and the control means controls the rotator in timed relationship with the input pulse so that the pulse is rotated in a first pass through the rotator to a polarization transmitted by the optical element within the optical path, and so that after at least one transit of the optical path, the captured pulse is rotated to the predetermined polarization, passes though the gain medium at least once more and is incident of the first face of the optical element so that it is reflected out of the optical path to provide the amplified pulse.

18. A laser amplifier for producing amplified pulses, having energy greater than about 20 joules per pulse and peak power greater than about a gigawatt, comprising:
a gain medium, comprising a slab of Nd:glass having first and second faces permitting transmission of light through the gain medium substantially independent of polarization;
a source of pump energy coupled with the gain medium including a pump cavity for producing a substantially uniform distribution of pump energy within the gain medium to minimize perturbations in light amplified by the gain medium;
a thermally compensated Pockels cell, having a peak power damage threshold;
optical relay means for relaying an image near the gain medium to a location near the Pockels cell so that a relatively smooth power distribution near the gain medium is established near the Pockels cell to prevent perturbations within the Pockels cell over the peak power damage threshold;
a plurality of reflectors configured to define an optical path through the gain medium, optical relay means and Pockels cell, each transit of the optical path including at least two passes through the gain medium and only one pass through the Pockels cell;
a polarizer mounted transverse to the optical path between the gain medium and the optical relay means, and having first and second faces at near Brewster's angle to the optical path for transmitting a first polarization, the optical element reflecting light having a second polarization;
means for supplying an input pulse having the second polarization and incident on the second face of the polarizer so that the input pulse is reflected into the optical path to provide a captured pulse for regenerative amplification; and
control means, coupled with the Pockels cell, for controlling the Pockels cell in timed relationship with the input pulse so that the captured pulse is rotated in a first pass through the Pockels cell to the first polarization transmitted by the polarizer, and so that after at least one transit of the optical path, the captured pulse is rotated to the second polarization, passes though the gain medium at least once more and is incident of the first face of the polarizer so that it is reflected out of the optical path to provide the amplified pulse, before passing through the Pockels cell again.

19. The laser amplifier of claim 18, wherein the first and second faces of the gain medium have anti-reflective coatings.

20. The laser amplifier of claim 18, wherein the optical relay means comprises a vacuum chamber, a first lense mounted with a vacuum tight seal at a first end of the vacuum chamber, and a second lense mount by a vacuum tight seal at a second end of the vacuum chamber, and wherein the first and second lenses are mounted so that the optical path proceeds slightly off axis through the lenses.

21. The laser amplifier of claim 18, wherein the means for supplying an input pulse includes means for relaying an image of the input pulse to a location near the gain medium, whereby an image of the input pulse is coupled into the gain medium, and the optical relay means relays the image of the input pulse to the location near the Pockels cell.

* * * * *